(12) United States Patent
Müller et al.

(10) Patent No.: US 6,751,394 B2
(45) Date of Patent: Jun. 15, 2004

(54) SLEEVE INSERT AND SLEEVE FOR GUIDING OPTICAL WAVEGUIDE ELEMENTS AND FOR ACCOMMODATING A SPLICING DEVICE

(75) Inventors: Thorsten Müller, Menden (DE); Rainer Zimmer, Schalksmühle (DE)

(73) Assignee: CCS Technology, Inc., Wilmington, DE (US)

( * ) Notice: Subject to any disclaimer, the term of this patent is extended or adjusted under 35 U.S.C. 154(b) by 147 days.

(21) Appl. No.: 10/182,495

(22) PCT Filed: Jan. 26, 2001

(86) PCT No.: PCT/DE01/00326
§ 371 (c)(1),
(2), (4) Date: Jul. 26, 2002

(87) PCT Pub. No.: WO01/55754
PCT Pub. Date: Aug. 2, 2001

(65) Prior Publication Data
US 2003/0039460 A1 Feb. 27, 2003

(30) Foreign Application Priority Data
Jan. 28, 2000 (DE) .......................................... 100 03 636

(51) Int. Cl.⁷ ................................................ G02B 6/00
(52) U.S. Cl. .......................... 385/135; 385/137; 385/147
(58) Field of Search ................................. 385/134–137, 385/147, 97–99

(56) References Cited

U.S. PATENT DOCUMENTS

| | | | | | |
|---|---|---|---|---|---|
| 6,130,982 | A | * | 10/2000 | Diermeier et al. | 385/135 |
| 6,360,051 | B1 | * | 3/2002 | Daoud | 385/137 |
| 6,456,772 | B1 | * | 9/2002 | Daoud | 385/135 |
| 6,466,725 | B2 | * | 10/2002 | Battey et al. | 385/135 |
| 6,687,450 | B1 | * | 2/2004 | Kempeneers et al. | 385/135 |

FOREIGN PATENT DOCUMENTS

| | | | | |
|---|---|---|---|---|
| DE | 29721956 U1 | 4/1998 | | G02B/6/36 |
| DE | 29908917 U1 | 7/1999 | | G02B/6/36 |
| EP | 0532980 B1 | 3/1993 | | H02G/15/076 |

\* cited by examiner

Primary Examiner—Brian Healy
Assistant Examiner—Kevin S. Wood

(57) ABSTRACT

A sleeve insert for guiding optical waveguide elements and for accommodating a splicing device, comprising a profiled body being adapted to the dimension of the respective sleeve. The sleeve insert provides for clear and secure arrangement of the optical waveguide elements, that is to say of the multifiber buffers and ribbon fibers and for the accommodation of splicing devices in one sleeve.

8 Claims, 6 Drawing Sheets

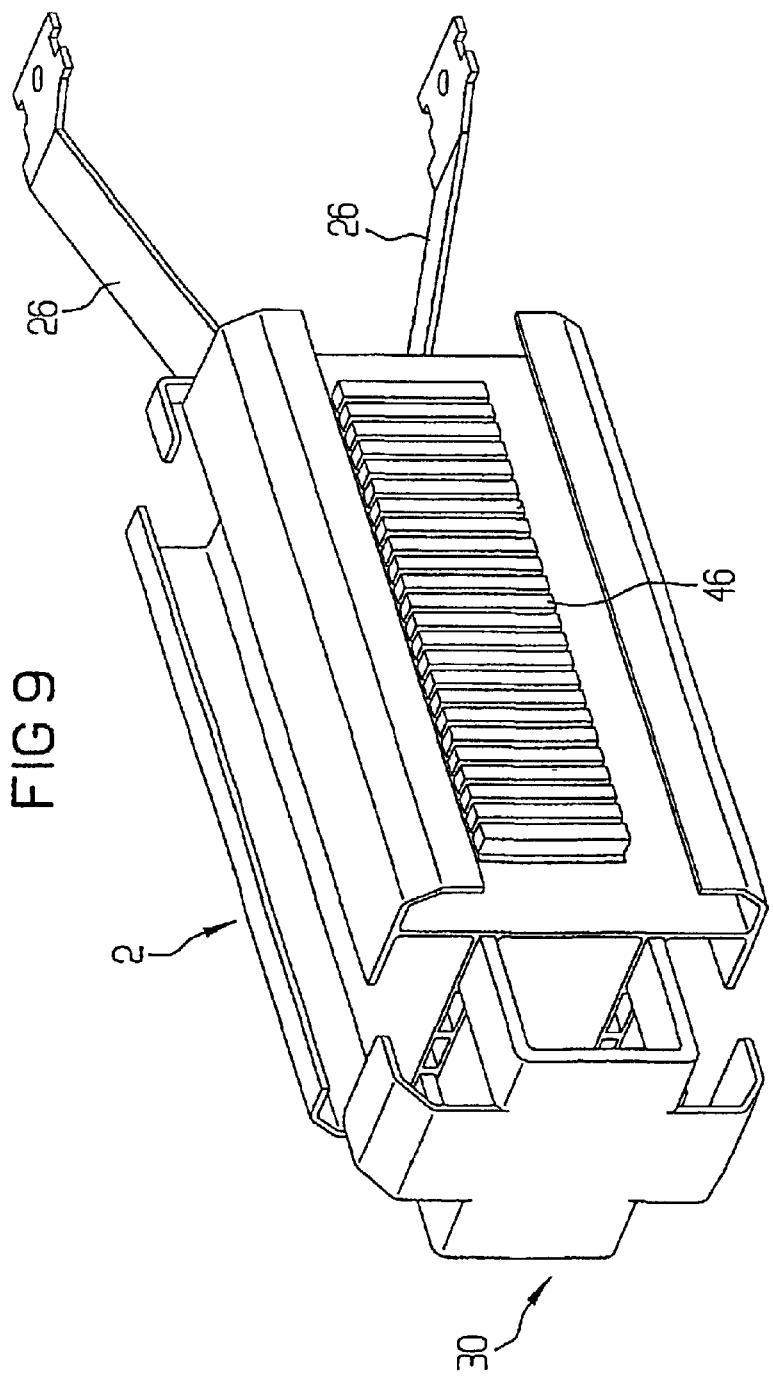

SLEEVE INSERT AND SLEEVE FOR GUIDING OPTICAL WAVEGUIDE ELEMENTS AND FOR ACCOMMODATING A SPLICING DEVICE

FIELD OF THE INVENTION

The invention relates to a sleeve insert and a sleeve, respectively, for guiding optical waveguide elements and for accommodating a splicing device.

BACKGROUND OF THE INVENTION

A technical problem occurring frequently is the clear and secure arrangement and placement of optical waveguide elements, for example multifiber buffers and ribbon fibers including their excessive lengths. Especially in modern telecommunications, for example when large optical fiber networks or conventional cable networks are used, the problem of clearly and securely placing the individual fibers after the splicing of a fiber bundle occurs time and again. Naturally, this should preferably occur in the immediate vicinity of the usual splicing devices, for example splicing cassettes or splice enclosures in which the fiber bundle is actually spliced.

The usual practice was, therefore, to arrange the splicing devices in a sleeve and to fix them in it. The sleeve can be a so-called cap sleeve or a through sleeve. A cap sleeve consists of an approximately dish-shaped closing element and a cap-shaped main part in which the splicing device and the optical waveguide elements including the excess lengths are arranged and which is connected to the closing element in order to form a closed sleeve. In the case of a through sleeve, dish-shaped closing elements are provided at both ends and, together with the main part, form a closed sleeve. The disadvantage of the known sleeves, however, is that the optical waveguide elements are run without any type of arrangement in this cassette package. In the case of maintenance, therefore, it is very difficult to find the correct multifiber buffers or fibers in each case.

SUMMARY OF THE INVENTION

It is, therefore, an object of the invention to provide a new sleeve insert or, respectively, a sleeve which provides for clear and secure arrangement of the optical waveguide elements, that is to say of the multifiber buffers and ribbon fibers and for the accommodation of splicing devices in one sleeve.

According to the invention, the object is achieved by a sleeve insert for guiding optical waveguide elements and for accommodating a splicing device, which is characterized in that it has a profiled body, the length of which must be adapted to the dimension of the respective sleeve, that the profiled body has two mutually opposite side walls which are constructed spaced apart from one another on a bottom wall so that the side walls and the bottom wall form a chamber, that the side walls have at their end facing away from the bottom wall in each case a guide wall which extend to the side facing away from the chamber, and that the bottom wall has at each of its ends a guide wall on both sides, in which arrangement, in addition to the chamber, three guide chambers arranged around the former are formed for accommodating and guiding optical waveguide elements in each case by means of two guide walls and the side walls and, respectively, the bottom wall. By means of this profiled body and, respectively, the chambers and guide chambers formed therein, a proper arrangement or management of the optical waveguide elements including the excess lengths and of the splicing devices is possible. The optical waveguide elements are conducted by the closing element into the interior of the sleeve or, respectively, into the profiled body where they are spliced in a splicing cassette or in a splice enclosure which are in each case arranged in one of the chambers, and the excess lengths of the optical waveguide elements or, respectively, of the multifiber buffers and ribbon fibers are then conducted from the splicing device into the adjoining chambers where they are properly placed. This results in clear and simple management of excess lengths.

An advantageous embodiment of the sleeve insert according to the invention is characterized in that the chamber is constructed for accommodating a splicing cassette. The chamber, which is slightly larger, is suitable for accommodating the splicing cassette, in which the optical waveguide elements leading to the splicing cassette and the optical waveguide elements coming from the splicing cassette can be conducted in a simple manner over the end edges of the profiled body and then into the adjoining guide chambers.

A further advantageous embodiment of the sleeve insert according to the invention is characterized in that one of the guide chambers is constructed for accommodating a splice enclosure. This makes it possible to arrange a splicing of the optical waveguide element clearly in one of the guide chambers.

A further advantageous embodiment of the sleeve insert according to the invention is characterized in that the side walls are constructed to be double-walled. This increases the stability of the sleeve insert.

A further advantageous embodiment of the sleeve insert according to the invention is characterized in that the double-walled side walls are constructed as latching means for attaching a cover and/or an attachment element. Attachment elements can be, for example, elastic legs which rest against the inside wall of the sleeve and thus hold the insert in the sleeve. The cover can be advantageously used for further protection and for additional guidance of the multifiber buffers accommodated.

A sleeve according to the invention with a main part and a closing element at one end of the main part or two closing elements at both ends of the main part, has a sleeve insert of the part described above. This advantageously results in a sleeve, the interior of which is equipped in such a manner that proper management of excess lengths in the interior of the sleeve is possible due to the construction of the profiled body.

An advantageous embodiment of the sleeve insert according to the invention is characterized in that the sleeve is a through sleeve, the incoming optical waveguide elements being inserted into the interior of the through sleeve through one connecting element and being brought out again through the closing element at the opposite end of the cap of the through sleeve. Here, too, the excess lengths of the optical waveguide elements are accommodated properly in the relevant guide chambers or, respectively, the main chamber.

An advantageous embodiment of the sleeve insert according to the invention is characterized in that the sleeve is a cap sleeve, the optical waveguide elements being inserted, and brought out again out of the sleeve through one and the same closing elements. In this type of sleeve, too, the profiled body ensures proper management of excess lengths.

A great advantage of the invention consists in that the same profiled body can be used for all sleeve lengths. In the field, for example, it is possible to shorten the profiled body to the length possible for the sleeve only on site.

BRIEF DESCRIPTION OF THE INVENTION

Exemplary embodiments of the invention are obtained from the following detailed description in conjunction with the attached drawings, in which:

FIG. 9 shows a further embodiment of the sleeve insert according to the invention, with a splice enclosure mounted thereon.

DETAILED DESCRIPTION OF THE INVENTION

Figure 1:
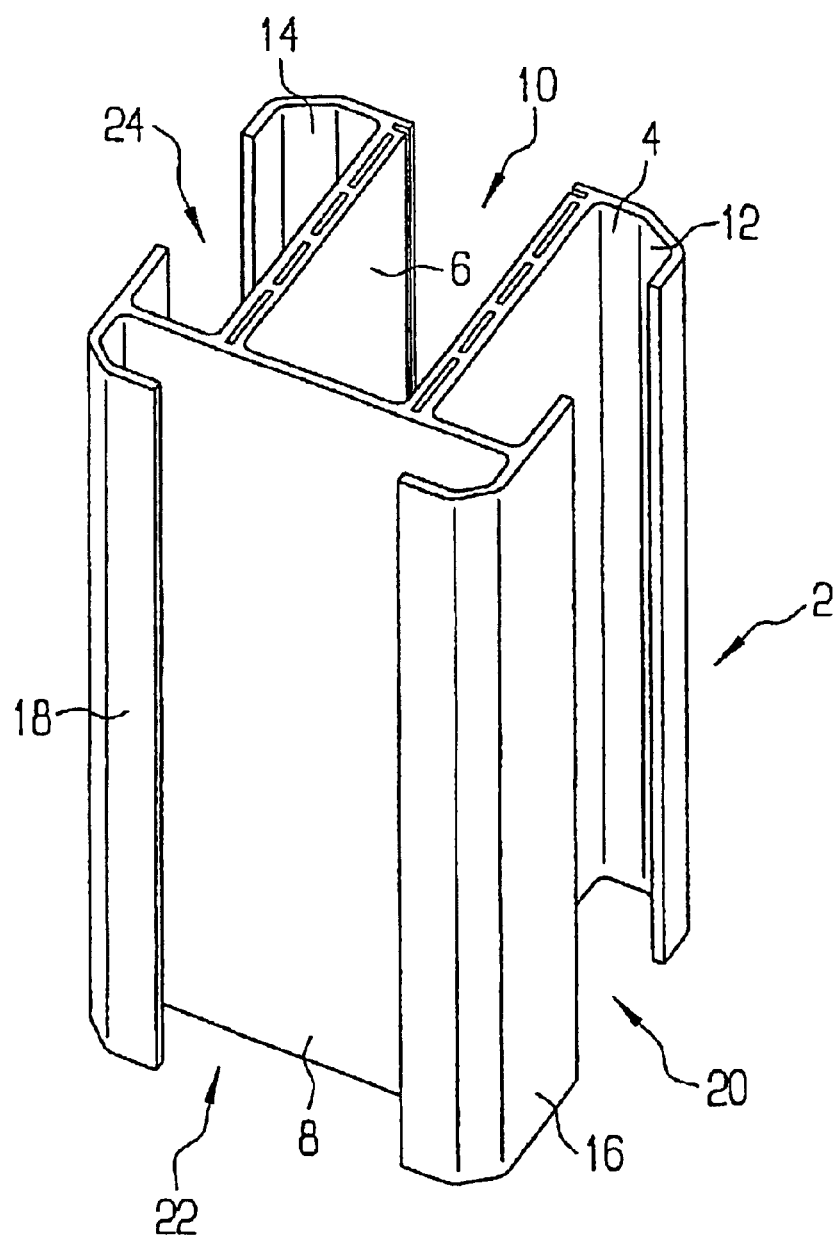
FIG. 1 shows a perspective view of a sleeve insert according to the invention.

FIG. 1 shows a perspective view of a sleeve insert which consists of a profiled body 2, the dimensions of which can be adapted to the dimension of the respective sleeve, particularly in its length.

The profiled body 2 consists of two side walls 4, 6 which are arranged in parallel at a distance from one another and which are constructed as double-walled flat elements in the preferred embodiment. The two side walls 4, 6 are constructed spaced apart from one another on a bottom wall 8 which is also a plane flat element. In the preferred embodiment, the two side walls 4, 6 are standing vertically on the bottom wall 8. However, the right angle between the side walls and the bottom wall is not mandatory.

The side walls 4, 6 and the bottom wall 8 delimit a chamber 10 of three sides which is constructed or, respectively, dimensioned for accommodating a splicing cassette. In this connection, it may be advantageous if the two side walls 4, 6 are constructed slightly toward one another on the bottom wall 8 so that, when the splicing cassette is introduced into the chamber 10, they are elastically pressed against the splicing cassette.

In addition, the two side walls exhibit at their end facing away from the bottom wall in each case a guide wall 12, 14 which extend away from the chamber 10. In a preferred embodiment, the guide walls 12, 14 are in each case constructed to be arc-shaped. The bottom wall 8, too, has at its ends in each case double-sided guide walls 16, 18. These guide walls 16, 18 extend on both sides of the bottom wall 8. In this manner, three further guide chambers 20, 22, 24 are produced around the chamber 10 which are in each case constructed for arranging and placing multifiber buffers and ribbon fibers including their excess lengths or for accommodating splice enclosures.

The sleeve insert shown can be constructed as an extruded plastic body or also as cast metal body.

Figure 2:
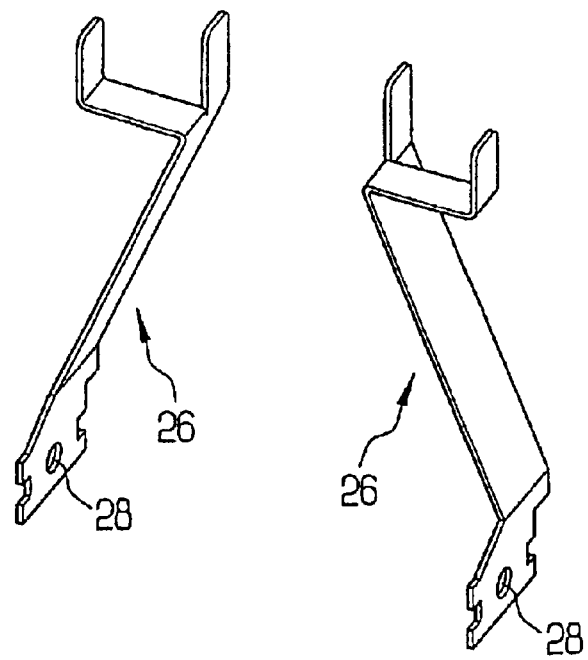
FIG. 2 shows a perspective view of two attachment elements.

FIG. 2 shows attachment elements 26 which are used for fixing the sleeve insert according to the invention in a sleeve. The attachment elements 26 can also be formed of plastic or metal and have a certain elasticity. The attachment elements 26 can be attached to the sleeve by means of clamping or screw engagement. For this purpose, threaded holes 28 are constructed at one end of the attachment elements.

Figure 3:
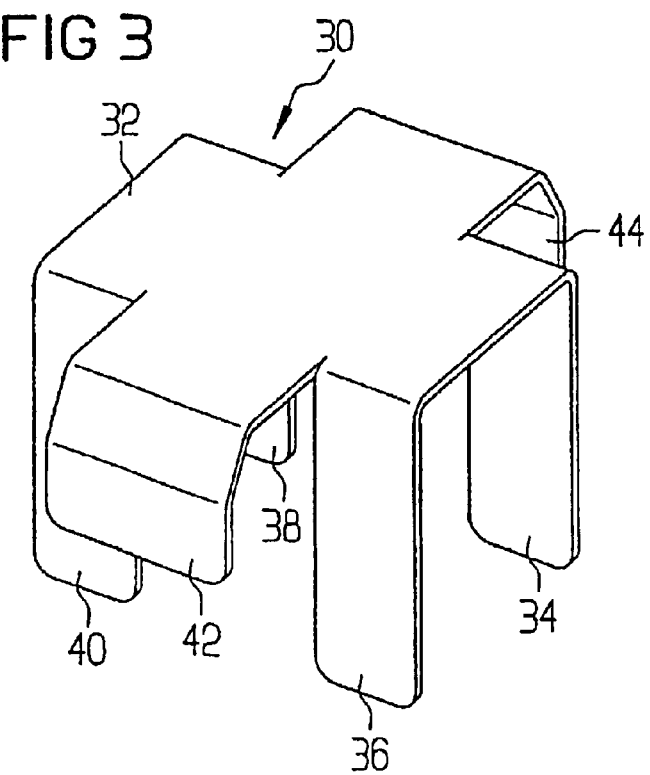
FIG. 3 shows a perspective view of a cover.

FIG. 3 shows a cover 30 for a sleeve insert according to the invention. The cover 30, which can also be constructed as a plastic body or metal body, has a base plate 32 from the corners of which four engaging elements 34, 36, 38, 40 extend. In addition, arc-shaped cover caps 42, 44 are constructed between two engaging elements at the longitudinal sides of the base plate 32.

Figure 4:
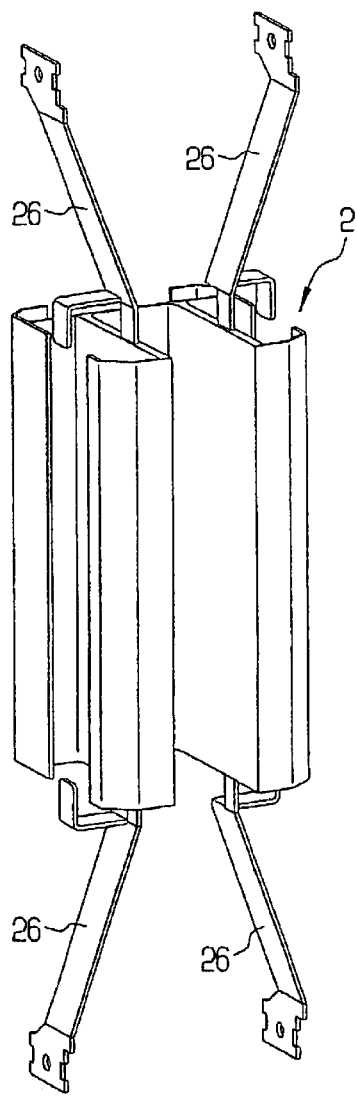
FIG. 4 shows a perspective view of a sleeve insert with attachment elements latched thereto.
Figure 5:
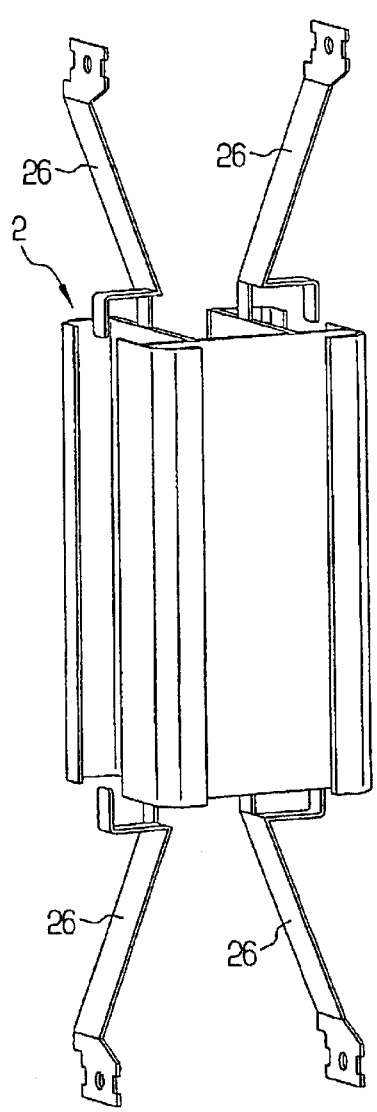
FIG. 5 shows the rear view of the sleeve insert shown in FIG. 4.

FIG. 4 shows a sleeve insert according to the invention as used in the case of a through sleeve. The sleeve insert is equipped with four attachment elements 26. The attachment elements 26 engage in the intermediate space between the double-walled side walls 4, 6 with one of their ends and become latched there. In this manner, attachment elements 26 are attached to the sleeve insert and are constructed with their ends facing away, in such a manner that they rest elastically against the outside wall of a through sleeve. This ensures that the sleeve insert can be securely held in the sleeve. FIG. 5 shows the rear view of this arrangement.

Figure 6:
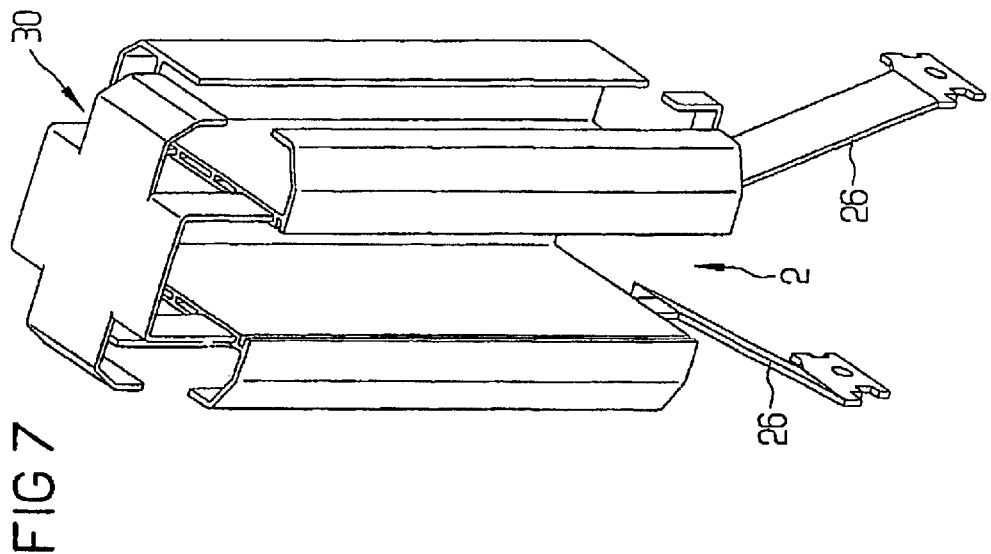
FIG. 6 shows a perspective view of a sleeve insert according to the invention with cover and attachment elements.
Figure 7:
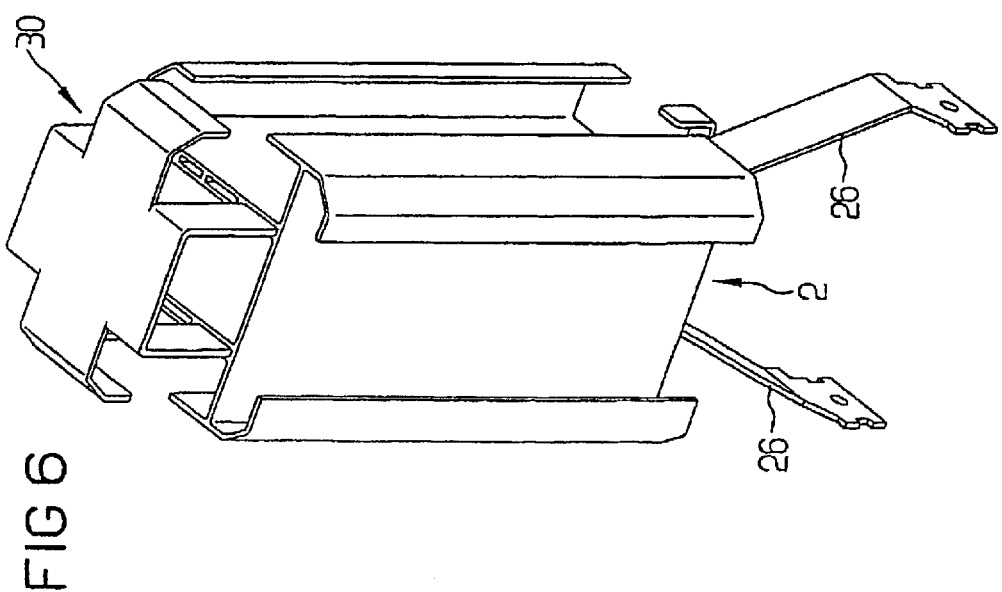
FIG. 7 shows the rear view of the arrangement shown in FIG. 6.

FIGS. 6 and 7 show the application of the sleeve insert according to the invention in conjunction with a cap sleeve. The profiled body 2 of the sleeve insert is provided with two attachment elements 26 at one of its ends. This end is turned toward the open end of the sleeve cap so that the attachment elements 26 can be connected to the dish-shaped closing element.

At the opposite end, that is to say the end facing away from the closed end of the sleeve, a cover 30 is provided. The cover 30 is also inserted into hollow spaces of the double-walled side walls 4, 6 and is latched there. The arc-shaped wall sections 42, 44 of the cover close off two of the guide chambers toward the end of the sleeve. FIG. 7 shows a rear view of the arrangement of FIG. 6.

Figure 8B:
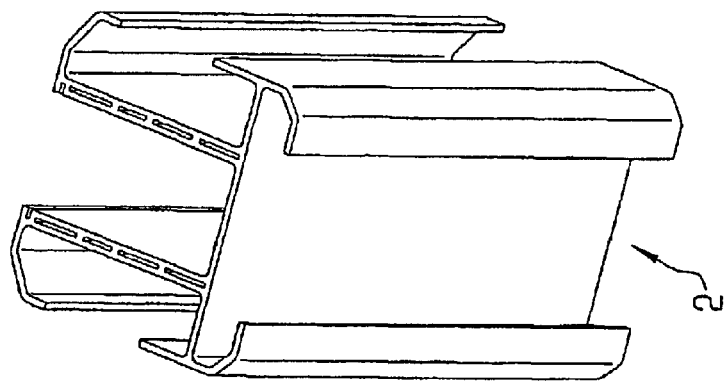
FIG. 8 shows two sleeve inserts according to the invention, with different lengths.
Figure 8A:
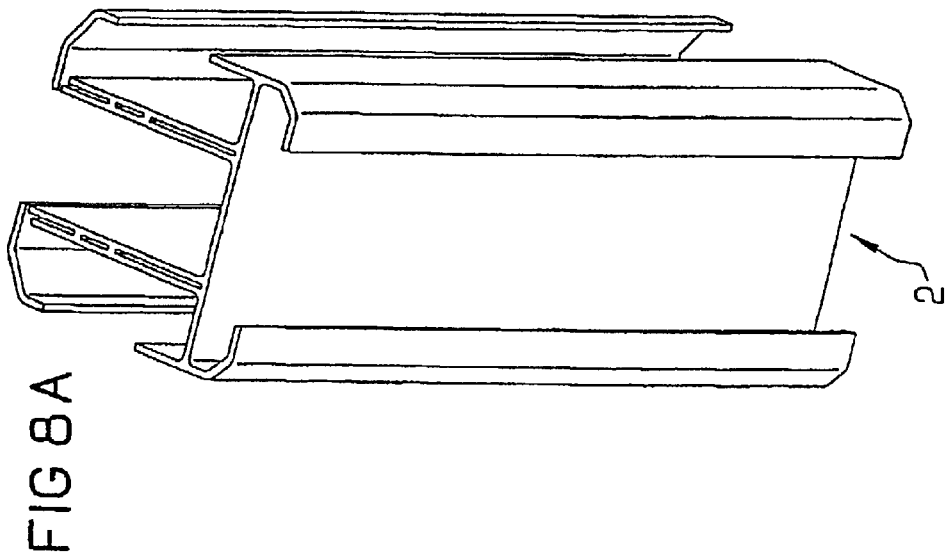

FIG. 8 shows two different lengths of the profiled body 2 for the sleeve insert. The profiled body can be advantageously extruded as a long continuous profile and cut into the lengths required in each case. FIG. 8 shows two possible lengths for different sleeves.

A second embodiment according to the invention is shown in FIG. 9. The embodiment of FIG. 9 differs from that of FIGS. 6 and 7 in this respect that the profiled body 2 is constructed with a splice enclosure in one of the guide chambers. Such a grid-like splice enclosure 46 is used for placing the splice in a clear manner.

The profiled body 2, the attachment elements 26 and the cover 30 together form a multifunctional fiber management system. In the profiled body 2, multifiber buffers or fiber ribbons can be arranged and a splicing cassette or a splice enclosure can be accommodated. The attachment elements 26 ensure that the profiled body 2 is securely held in a sleeve. The cover 30 is provided for protecting the multifiber buffers or fiber ribbons.

When through sleeves are used, attachment elements 32 are correspondingly provided at both ends of the profiled body 2. These can be attached either with corresponding engagement means in a latching manner on the profiled body 2 or interact with the latter by means of a screw connection.

The profiled body 2 is preferably formed as an extruded plastic profile so that it can be adapted without problems to different sleeve lengths. The double-walled construction of the side walls 4, 6, producing pockets or grooves, respectively, enables the attachment elements 26 or the cover 30 to be latched in.

As already stated, the profiled body 2 thus forms three guide chambers 20, 22, 24 for accommodating excess lengths and guiding multifiber buffers, and areas for placing the splicing cassette or the splice enclosure. If instead of the multifiber buffers, for example fiber ribbons must be arranged, one of the guide chambers 20, 22, 24 can be used directly for accommodating the splice. For this purpose, a splice enclosure 46 is then preferably mounted in this chamber.

This system with three guide chambers 20, 22, 24 enables the individual multifiber buffers/fiber ribbons to be optimally separated so that, for example, incoming and outgoing cables or cut cables and uncut cables can be arranged and guided in the best possible manner.

The attachment elements 26, in turn, form the connection to the sleeve or to the sealing body, respectively, where they are attached by means of screws, for example. For this purpose, threaded holes 28 can be provided at the respective ends, resting against the surface of the sleeve, of the attachment elements 26.

Although the invention has been described in conjunction with a preferred embodiment, it is not restricted thereto. Thus, for example, the guide walls 12, 14 at the side walls 4, 6 are in each case shown to be arc-shaped in the figures. However, the guide walls 12, 14 can also be rectangular. Similarly, the guide walls 16, 18 at the bottom wall 8 are shown to be arc-shaped. This, too, is not absolutely mandatory. However, the arc-shaped embodiment of the guide walls 12, 14 is of advantage in connection with bottom sleeves since this provides additional guidance of the profiled body 2 in the sleeve.

In the embodiment shown, the first side walls are attached at right angles on the second side piece. This, too, is not absolutely mandatory. In particular it may be advantageous to construct the two side walls 4, 6 to be inclined toward one another. In this manner, the splicing cassette is held elastically in the chamber 10.

What is claimed is:

1. A sleeve insert for guiding optical waveguide elements and for accommodating a splicing device, comprising a profiled body, the length of which must be adapted to the dimension of the respective sleeve, the profiled body exhibiting the following: a bottom wall, two side walls which are opposite one another at a distance from one another and which are in each case constructed on the bottom wall at a distance from the longitudinal side edge of the bottom wall, the side walls and the bottom wall forming a chamber, the side walls having at their end facing away from the bottom wall in each case an upper guide wall which, in cross section, coming from the bottom wall, first extends a little way in the direction of the side facing away from the chamber and a little way in the direction of the bottom wall, and the bottom wall having at each of its longitudinal side edges a lower guide wall which, in cross section, extends in the direction of the end, facing away from the bottom wall, of the associated side wall, so that it in each case forms, together with the respective associated upper guide wall, a lateral guide chamber and which, in cross section, also initially extends a little way away from the end facing away from the bottom wall and then a little way toward the inside, so that furthermore a lower guide chamber is formed by the two lower guide walls.

2. The sleeve insert as claimed in claim 1, the chamber being constructed for accommodating a splicing cassette.

3. The sleeve insert as claimed in claim 1, one of the guide chambers being constructed for accommodating a splice enclosure.

4. The sleeve insert as claimed in claim 1, wherein the side walls are constructed to be double-walled.

5. The sleeve insert as claimed in claim 4, wherein the double-walled side walls are constructed as latching means for attaching a cover and/or attachment elements.

6. A sleeve comprising a base body and a closing element at one end of the base body or two closing elements at both ends of the base body, and a sleeve insert as claimed in one of the preceding claims.

7. The sleeve as claimed in claim 6, the sleeve being a through sleeve.

8. The sleeve as claimed in claim 6, the sleeve being a cap sleeve.

* * * * *